United States Patent

Neuberger et al.

[15] 3,641,821
[45] Feb. 15, 1972

[54] SAMPLING SYSTEM FOR STACK GAS

[72] Inventors: Edmond Donald Neuberger; Thomas Joseph Junker, both of Pittsburgh, Pa.

[73] Assignee: Calgon Corporation, Pittsburgh, Pa.

[22] Filed: Apr. 7, 1970

[21] Appl. No.: 26,340

[52] U.S. Cl. .................73/421.5 R, 23/232, 23/254
[51] Int. Cl. ..............................................G01n 1/24
[58] Field of Search..................73/421.5, 421.5 A, 422; 23/2 A; 261/116

[56] References Cited

UNITED STATES PATENTS

| 2,306,606 | 12/1942 | Hirsch | 73/422 |
| 2,987,921 | 6/1961 | Kraftson | 73/421.5 |
| 2,797,188 | 6/1957 | Taylor, Jr. | 23/2 A |

FOREIGN PATENTS OR APPLICATIONS 737,671   7/1966   Canada..................73/421.5

Primary Examiner—S. Clement Swisher
Attorney—William L. Krayer

[57] ABSTRACT

A system is described for withdrawing a gaseous or other sample from a source and preparing it for analysis. The sampling device employs a steam eductor which utilizes steam as the force for moving the sample and at the same time for scrubbing the sample. Soluble an insoluble components of the sample are present in dissolved or suspended form in the condensate. The system is particularly useful to provide a continuous sample. A chemical may be added to the steam to enhance the tendency of a component of a gaseous sample to enter the liquid phase.

9 Claims, 2 Drawing Figures

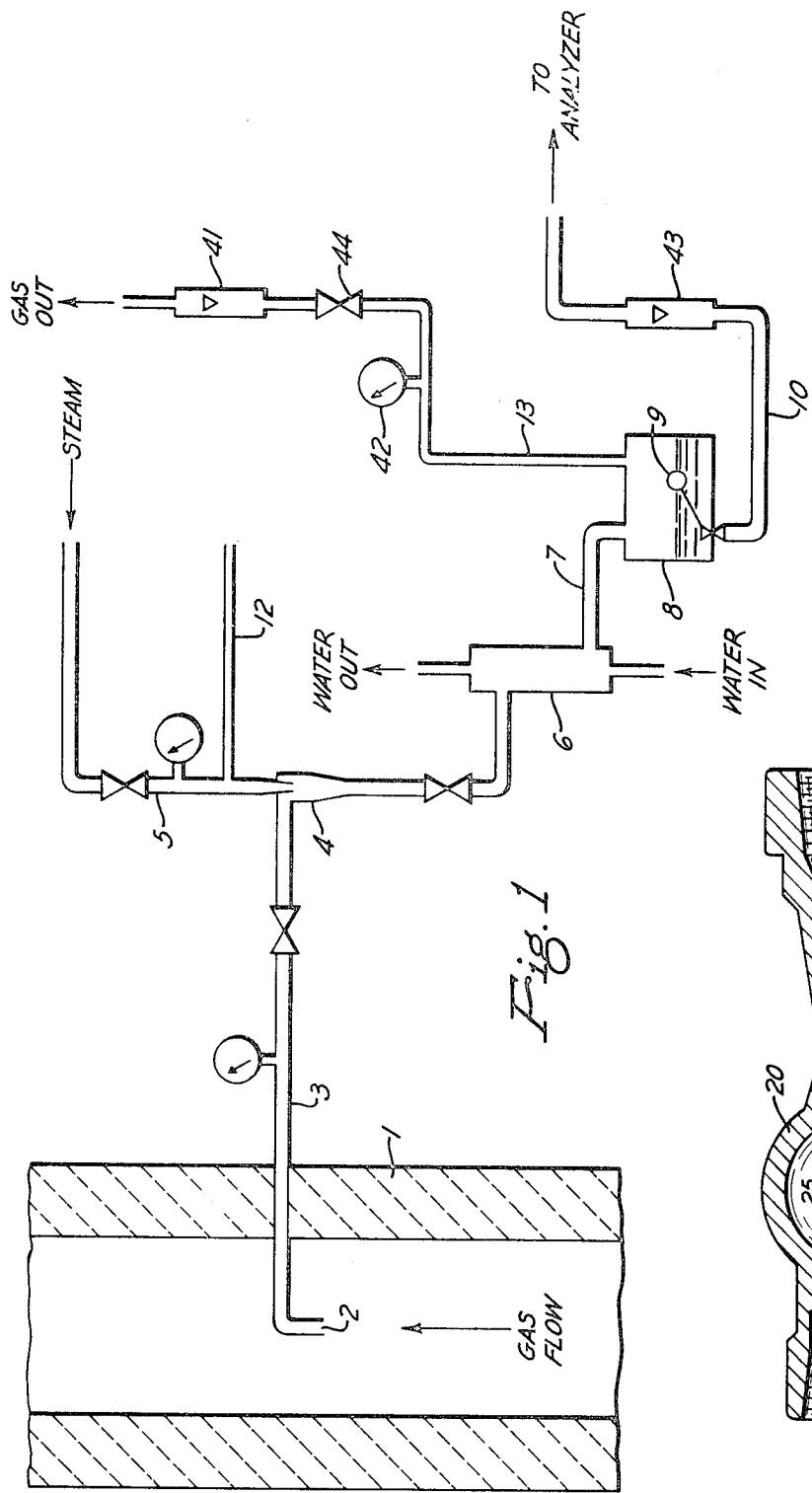

SAMPLING SYSTEM FOR STACK GAS

BACKGROUND OF THE INVENTION

Periodic or continuous analyzing of gases can be useful in two major respects—to monitor and/or control the efficiency of an industrial process which emits the waste gases, and to monitor and/or control the emission of particular components thereof. Emission of waste products in the form of stack gases and liquid or solid materials carried with them has become a problem of great concern to persons interested in an aesthetically appealing and wholesome environment. Many waste gases and solid materials carried with them are toxic, even in very small amounts. Inhalation of more ordinary waste products over long periods of time can also be harmful to health. Some components of industrial waste gases are well known to be destructive to paint, corrosive to metals, etc. The desirability of controlling waste gas emissions needs no further proof.

Monitoring of a single component or characteristic of a waste gas may reveal much information about its content of other components, the efficiency of the process, etc. Our invention is designed for the preparation of a continuous or chronologically orderly sample for the analysis of one or more components of a sample gas.

Steam eductors have been used to move materials in the past, and have also been used as scrubbers for gases. They have not been used to our knowledge, however, to entrain a sample of a gas, particularly air or a stack gas, followed immediately by condensation of the sample/steam mixture in a predetermined ratio, the condensate to be used as a sample for analysis.

SUMMARY OF THE INVENTION

We have invented a system for obtaining a continuous sample of a gas or liquid. The source of the sample may be an open atmosphere, chamber, or conduit. The most common application presently contemplated is an industrial waste gas stack.

The system comprises a sample probe located at the desired point of collection, such as inside a conduit or stack, passing through the wall thereof, and a steam eductor connected thereto. The sample/steam mixture prepared by the eductor passes through a cooling coil and from the cooling coil to the analyzer. Optionally, a condensate collecting chamber may follow the cooling coil. Our invention also contemplates the introduction of an amine or other chemical to the steam to enhance the ability of a particular gas sample component to dissolve in the steam.

The system will be discussed with reference to the drawing which is attached.

FIG. 1 is a more or less diagrammatic representation of our sample collecting system.

FIG. 2 is a sectional view of a preferred steam eductor used in our system.

Referring to FIG. 1, the stack or other conduit 1 contains waste gases and entrained liquids and solids which move in a vertical direction. A sample probe 2 is positioned in a prominent place in the stack. The probe is connected to a suitable tube 3 which passes through the wall of the stack. To induce the passage of the sample into the probe, a negative pressure is supplied by steam eductor 4.

Steam passes through pipe 5 from a source thereof, not shown, and, after picking up the sample in the eductor 4, passes into condenser 6. Pipe 12 may be used to introduce into the steam a chemical for enhancing the tendency of a particular component to enter the liquid phase, e.g., to dissolve in the steam or otherwise be entrained, conditioned or chemically combined for analysis as a component of the steam condensate. In condenser 6, the steam and condensable material therein are converted to a liquid which is drained or removed through conduit 7 to optional collector 8. Collector 8 should be equipped with a float valve 9 or other means to ensure that the liquid sample delivered to the analyzer through conduit 10 chronologically represents the composition of the gas sample, either continuously or intermittently. Collector 8 has a gas escape line 13 on which is affixed a pressure gauge 42, needle valve 44 and rotameter 41, which contains an optional temperature and pressure indicator for calculating the absolute humidity in gas line 13. A second rotameter 43 is placed in line 10.

FIG. 2 is a side sectional view of a preferred steam eductor. It comprises a body 20 including three ports 21, 22, and 23, and a steam nozzle 24. The body 20 defines a chamber 25 and a constriction 26 in the area divergently leading to exit port 23.

Steam is introduced through opening or port 21 into nozzle 24, exiting into chamber 25 and passing through constriction 26 and port 23. When port 22 is connected to a source of sample, the negative pressure induced by the passage of the steam through the eductor causes the sample to be entrained with the steam in more or less constant proportions, depending on the amount of variation in their respective flow rates at the source. Water-soluble solids and gasses in the sample will be in the dissolved form in the condensate leaving the condenser.

Our preferred eductor uses on the average about 30 pounds of steam per hour, producing a maximum of about 225 cc. of condensate per minute.

When all factors such as temperature and pressure are controlled, our system provides a controlled, relatively small dilution of the sample. The dilution factor may be affected by the size of the nozzle in the eductor, the internal diameter of the sample probe, the flow rate of the steam in the eductor, and by opening or closing valve 44. Most conveniently, valve 44 provided in exhaust line 13 will regulate the sample flow. This should be calibrated on installation.

The greater the negative pressure generated by the eductor, the larger will be the sample; however, the ratio of steam to sample should always be known. Accordingly, it is desirable to know at all times the steam and sample flow rates. The sample flow rate is influenced not only by the internal diameter of the conduit 3, the degree of opening of valves thereon and on line 13 and the negative pressure in the eductor, but also by the velocity of the stack gas or other sample material. More or less ideal isokinetic conditions may be assumed; i.e., it can be assumed that the velocity of the sample in the sample probe is equal to the velocity of gas in the immediate vicinity of the probe nozzle.

Rotameter 41, the optional pressure gauge 42 and the temperature indicator located in rotameter 41, all on line 13, will assist the operator in providing an analysis reported in units of analyzer constituent per unit of dry gas. The pressure and temperature in gas line 13 are relatively stable. The flow rates of the gas, measured by rotameter 41, and the liquid sent to the analyzer, measured by rotameter 43, are thus significant factors. An analyzer which measures a contaminant in terms of parts by weight of contaminant per million parts by weight of sample may be adjusted to read in absolute terms. That is, the reading may be taken as grams or pound of contaminant per unit of time. By making a simple correction based on the absolute humidity (a function of the temperature and pressure) of the gas stream leaving the sampling system, it is possible to express the degree of contamination as units of contaminant per unit weight or volume of original dry gas sample. When the degree of contamination changes, the result is a corresponding, meaningful change in the concentration of contaminant in the liquid stream.

In calculating the influence of the water content of the stack gas or other material to be sampled, it should be observed that the exhaust gas emitted downstream of the condenser, as by outlet 13, will contain some water vapor. If, for example, the sample in line 3 contains 5 percent water vapor and the exhaust line contains 3 percent water vapor, a correction factor may be computed relating these numbers to the respective flow rates. The correction factor is the ratio of noncondensables in the stack gas to the noncondensed material in the exhaust, or expressing these factors in percentages, $$(100 - 5/100 - 3) = 0.976.$$

A correction factor for temperature may be calculated by computing the ratio of the absolute temperature of the exhaust gas to the absolute temperature of the source or stack gas.

The weight of the material analyzed, in parts by weight per million parts of dry sample, may be calculated by multiplying the weight of condensate per volume of dry gas sample (in pounds per cubic foot, for example) times the concentration of contaminant in the analyzer in parts per million of condensate. This answer may be converted easily to parts of contaminant per million parts by weight of dry emitted gas.

Where an alarm system or relatively rough reading may be used, the effect of water vapor may be ignored, or an empirical correction factor may be employed, as by computer. This will enable the user to read the final answer from the analyzer in absolute terms, i.e., pounds of contaminant emitted per hour through the stack.

Any gas which is soluble in water will be collected by our system. In some cases, associated elements may be monitored if their relation to the undesirable gas or the efficiency of the process is known. Additives may be injected into the steam prior to, during or after, its passage through the eductor to increase the affinity of a gas, such as $SO_2$ or $SO_3$ for dissolution in the steam or the condensate, or otherwise enhance its tendency to enter the liquid phase. Illustrative examples of such additives are the monoethanolamine, diethanolamine, and triethanolamine, and neutralizing amines such as cyclohexylamine and morpholine. We know of no minimum amount which is absolutely ineffective; i.e., a very small amount is effective to a correspondingly small degree. The maximum amount will be determined by economics and possible adverse effects on the condenser, etc.

The samples delivered by our system are particularly of use in continuous analyzers such as chloride, fluoride, sodium, conductivity, and colorimetric analyzers. It will be observed that the liquid collector 8 or elsewhere in the sample system may contain solid particles. Useful information may be obtained by measuring the turbidity of the sample, or by otherwise separating and analyzing the solid material.

Our system is applicable to the preparation of liquid samples as well as those derived from gas streams. The steam eductor functions in such cases as a pump and a diluter as well as a scrubber.

We claim:

1. Apparatus for continuously sampling fluid material comprising a sample probe, a steam eductor connected thereto for inducing the flow of sample and mixing it in substantially constant proportion with steam therein and with no other medium not in substantial proportion to sample flow, condenser means for condensing the steam and sample components entrained therewith, and means for delivering condensate from the condenser means to an analyzer.

2. Apparatus of claim 1 including means for measuring the flow of gas which leaves the condenser.

3. Apparatus of claim 1 including means for separating gas and condensate leaving the condenser, and means for determining the water content of the gas leaving the condenser.

4. Apparatus of claim 1 including means for adding to the steam a chemical having an affinity for a component of the fluid sample.

5. Apparatus of claim 1 including means for measuring the flow of condensate to the analyzer.

6. Method of preparing a gas sample for analysis comprising injecting the gas into a jet of steam in an eductor to entrain at least some of the gas therein, condensing the steam including the gas entrained therein, separating free gas from the condensate, and delivering the condensate to an analyzer.

7. Method of preparing a gas sample for analysis comprising injecting said gas into a jet of steam, and adding to the steam a chemical having the ability to enhance the tendency of a gas component to enter the liquid phase.

8. Method of claim 7 in which the chemical added to the steam is an ethanolamine.

9. Method of claim 7 in which the chemical added to the steam is a neutralizing amine.

* * * * *